US010464855B2

(12) United States Patent
Allais et al.

(10) Patent No.: US 10,464,855 B2
(45) Date of Patent: Nov. 5, 2019

(54) PROCESS FOR PREPARING A UREA-SULPHUR FERTILIZER

(71) Applicant: SHELL OIL COMPANY, Houston, TX (US)

(72) Inventors: Cyrille Paul Allais, Amsterdam (NL); Rafael Alberto Garcia Martinez, Calgary, Alberta (CA)

(73) Assignee: SHELL OIL COMPANY, Houston, TX (US)

( * ) Notice: Subject to any disclaimer, the term of this patent is extended or adjusted under 35 U.S.C. 154(b) by 86 days.

(21) Appl. No.: 15/110,239

(22) PCT Filed: Jan. 7, 2015

(86) PCT No.: PCT/EP2015/050158
§ 371 (c)(1),
(2) Date: Jul. 7, 2016

(87) PCT Pub. No.: WO2015/104286
PCT Pub. Date: Jul. 16, 2015

(65) Prior Publication Data
US 2016/0332923 A1 Nov. 17, 2016

(30) Foreign Application Priority Data
Jan. 9, 2014 (EP) .................................... 14150650

(51) Int. Cl.
C05C 9/00 (2006.01)
C05D 9/02 (2006.01)
C05G 3/00 (2006.01)

(52) U.S. Cl.
CPC ............... *C05C 9/00* (2013.01); *C05C 9/005* (2013.01); *C05D 9/02* (2013.01); *C05G 3/0058* (2013.01)

(58) Field of Classification Search
None
See application file for complete search history.

(56) References Cited

U.S. PATENT DOCUMENTS

| 3,100,698 A * | 8/1963 | Horsley .................... C05C 9/00 71/1 |
| 3,519,413 A | 7/1970 | Trimbach et al. |
| 3,697,245 A | 10/1972 | Dilday |
| 3,725,029 A | 4/1973 | Blackmore |
| 4,330,319 A * | 5/1982 | Bexton .................... C05C 9/005 366/336 |
| 4,372,872 A | 2/1983 | Backlund |
| 4,832,728 A | 5/1989 | Allan et al. |
| 5,082,487 A | 1/1992 | Mayer |
| 5,522,553 A | 6/1996 | LeClair et al. |
| 6,331,193 B1 | 12/2001 | Phinney |
| 7,998,235 B2 | 8/2011 | Kohnke et al. |
| 8,668,759 B2 | 3/2014 | Antens et al. |
| 8,679,219 B2 | 3/2014 | Garcia Martinez et al. |
| 9,598,322 B2 * | 3/2017 | Allais .................... C05C 9/005 |
| 2007/0095118 A1 | 5/2007 | Evers et al. |
| 2010/0288005 A1 * | 11/2010 | Schromm .................. B01J 2/18 71/28 |
| 2012/0036906 A1 | 2/2012 | Pedersen |
| 2012/0128981 A1 | 5/2012 | Iyer |

FOREIGN PATENT DOCUMENTS

| CA | 811080 | 4/1969 |
| CN | 1628084 | 6/2005 |
| CN | 101402532 | 4/2009 |
| CN | 101967070 | 2/2011 |
| NZ | 213682 | 10/1985 |
| WO | 2003106376 | 12/2003 |
| WO | 2010058038 | 5/2010 |
| WO | 2010086395 | 8/2010 |
| WO | 2010086396 | 8/2010 |
| WO | 2010102389 | 9/2010 |
| WO | 2011015306 | 2/2011 |
| WO | 2012118532 | 9/2012 |
| WO | 2013098404 | 7/2013 |
| WO | 2014009326 | 1/2014 |
| WO | 2015017329 | 2/2015 |
| WO | 2015104286 | 7/2015 |
| WO | 2015104293 | 7/2015 |
| WO | 2015104296 | 7/2015 |

* cited by examiner

Primary Examiner — Wayne A Langel

(57) ABSTRACT

A process for preparing a urea-sulphur fertiliser is disclosed. Urea and sulphur are supplied to a dispersion mill wherein a rotor turns within a slotted stator, thereby providing a dispersion of molten urea and molten sulphur; and the dispersion of molten urea and molten sulphur is supplied to a forming unit to provide the urea-sulphur fertiliser.

10 Claims, No Drawings

PROCESS FOR PREPARING A UREA-SULPHUR FERTILIZER

PRIORITY CLAIM

The present application is the National Stage(§ 371) of International Application No. PCT/EP2015/050158, filed Jan 7. 2015, which claims priority from European Patent Application No. 14150650.1, filed Jan 9, 2014 incorporated herein by reference.

FIELD OF THE INVENTION

The present invention provides a process for the preparation of a urea-sulphur fertiliser.

BACKGROUND OF THE INVENTION

Urea is commonly used as a fertiliser, supplying nitrogen to plants. Many soils also require sulphur as a plant nutrient, so fertilisers containing both urea and elemental sulphur have been developed. Desirably the elemental sulphur needs to be present as small dispersed particles to allow its oxidation in the soil to the plant available sulphate ion.

U.S. Pat. No. 3,100,698 discloses a urea-sulphur fertiliser that is made by combining molten urea and molten sulphur and subjecting the mixed melt to a prilling process. The mixed melt can also be prepared by adding solid urea prills to molten sulphur, or by adding solid sulphur to molten urea.

Melting sulphur and melting urea can be an energy intensive and therefore costly process, and can require sizeable equipment. Additionally, if melting of urea is not done quickly and in a controlled manner (i.e. the temperature is controlled such that it does not significantly exceed the melting point of urea), there is a risk of urea degradation. In particular, there is a risk of biuret production. Biuret is a phytotoxin (a material that is toxic to plants) and can be formed when urea is heated. Biuret interferes with nitrogen metabolism and protein synthesis in plants. It is desirable to reduce the amount of biuret in fertilisers.

The present inventors have sought to provide an improved process for the preparation of urea-sulphur fertiliser which is desirably simpler and more energy efficient than known processes. Preferably the process will allow for rapid yet controlled melting of fertiliser constituents, thereby reducing the risk of impurity formation whilst enabling the size reduction of sulphur to yield finely dispersed sulphur particles in the final product.

SUMMARY OF THE INVENTION

Accordingly, the present invention provides a process for preparing a urea-sulphur fertiliser comprising steps of:
(a) supplying urea and sulphur to a dispersion mill wherein a rotor turns within a slotted stator, thereby providing a dispersion of molten urea and molten sulphur; and
(b) supplying the dispersion of molten urea and molten sulphur to a forming unit to provide the urea-sulphur fertiliser;
wherein solid sulphur, solid urea or solid urea-sulphur is supplied to the dispersion mill.

It is not necessary that all of the urea or all of the sulphur that is supplied to the dispersion mill is solid urea, solid sulphur or solid urea-sulphur and indeed in many embodiments of the invention the majority of urea and/or sulphur will be supplied as molten urea and molten sulphur. However, in all embodiments of the invention, at least some of the urea or at least some of the sulphur is supplied as solid sulphur, solid urea or solid urea-sulphur.

In the process of the invention the dispersion mill is performing two functions: firstly it melts the solid sulphur, solid urea, or solid urea-sulphur, and secondly it mixes sulphur and urea to form a homogeneous dispersion of molten sulphur in molten urea (if urea is the main constituent of the melt), or a homogeneous dispersion of molten urea in molten sulphur (if sulphur is the main constituent of the melt). Preferably, the homogeneous dispersion is one of molten sulphur in molten urea. By using a single piece of apparatus (the dispersion mill) for both melting and mixing, the present inventors have provided a simplified process. A dispersion mill typically produces heat, and the process of the invention is able to use this heat to melt sulphur and/or urea. Further, the dispersion mill breaks down the solids fed to it, hence increasing their surface area and increasing their melting kinetics. The inventors believe that the energy requirements of the process are reduced compared to conventional processes. Additionally, by providing a process wherein one or more constituents can be melted as they are combined with sulphur, the inventors have enabled short residence times for melting and mixing the constituents, thereby reducing the need for separate melters and reducing the risk of impurity formation.

DETAILED DESCRIPTION OF THE INVENTION

In the process of the invention, urea and sulphur are supplied to a dispersion mill wherein a rotor turns within a slotted stator, thereby providing a dispersion of molten urea and molten sulphur. Solid sulphur, solid urea and/or solid urea-sulphur are supplied to the dispersion mill. The process of the invention is typically a continuous process such that the solid sulphur, solid urea or solid urea-sulphur is supplied to a dispersion mill that already contains a dispersion of molten urea and molten sulphur.

The solid urea, solid sulphur and/or solid urea-sulphur are drawn by the rotation of the rotor into the rotor/stator assembly, and are accelerated and expelled radially through the openings in the slotted stator. With each pass through the rotor/stator assembly, the solid is subjected to a combination of mechanical and hydraulic shear such the particles of solid urea, solid sulphur or solid urea-sulphur are reduced in size. The solid urea, solid sulphur or solid urea-sulphur is also subjected to heating and will melt.

The conventional action of the dispersion mill (rotor turning within the stator) produces heat. However, in a preferred embodiment of the invention, further energy is supplied to the dispersion mill, e.g. the mill is jacketed and a fluid is passed through the jacket to heat the mill, or electrical heating is applied to the mill. Preferably the temperature in the dispersion mill is from 115 to 150° C., more preferably from 130 to 145° C. and most preferably from 135 to 140° C. Preferably the preferred energy input for the mill is from 1 to 100 kWh/tonne product.

A preferred dispersion mill has a slotted rotor inside a slotted stator. Suitable dispersion mills are described in U.S. Pat. No. 5,522,553 and are available from Kady International, USA.

The sulphur that is supplied to the dispersion mill can be obtained from any suitable source. The sulphur may be high purity (>99.9% S) chemical sulphur as obtained from the Claus process. However, the process of the present invention can use sulphur of significantly lower purity than this. Examples of such sulphur sources are sulphur filter cake as obtained from sulphur melting and filtration operations and sulphur obtained from a various chemical and biological $H_2S$ gas removal processes. Typically, such sulphur sources may contain anywhere in the range of from 30 to 99.9 wt %, preferably from 50 to 99.5 wt %, more preferably from 60 to 99.0 wt %, sulphur.

In a first embodiment of the invention, solid sulphur is supplied to the dispersion mill. The solid sulphur may be added as granules, pellets, slates, powder or any other solid form. Suitably at least 20 wt % of the total sulphur supplied is supplied as solid sulphur; preferably at least 50 wt % and more preferably at least 80 wt %. In this embodiment it is preferred that all of the sulphur supplied to the dispersion mill is solid sulphur and all of the urea supplied to the dispersion mill is molten urea.

In a second embodiment of the invention, solid urea is supplied to the dispersion mill. The solid urea is preferably added as urea prills. In this embodiment it is preferred that some or all of the urea is supplied to the dispersion mill as solid urea, and that all of the sulphur supplied to the dispersion mill is molten sulphur. Suitably at least 2 wt % of the total urea supplied is supplied as solid urea; preferably at least 5 wt % and more preferably at least 10 wt %.

In a third embodiment of the invention, solid urea-sulphur is supplied to the dispersion mill. In this embodiment it is preferred that molten urea and molten sulphur are supplied to the dispersion mill and that in addition, solid urea-sulphur is supplied to the dispersion mill. Suitably at least 20 wt % of the total sulphur supplied is supplied as solid urea-sulphur; preferably at least 50 wt % and more preferably at least 80 wt %. Suitably at least 2 wt % of the total urea supplied is supplied as solid urea-sulphur; preferably at least 5 wt % and more preferably at least 10 wt %.

So-called off-spec materials are suitably used as the solid urea, solid sulphur or solid urea-sulphur in the present invention. When granulating urea or materials such as urea-sulphur, oversized granules and fines of the material are produced. These oversized granules and fines are typically re-melted and sent to the granulation section of the plant or redirected to the urea synthesis plant. Re-melting these oversized material and fines is energy intensive and can increase the content of unwanted impurities such as biuret. In the case of urea, redirecting these oversized material and fines to the urea synthesis plant is acceptable, however, in the case of urea-sulphur, this would potentially lead to severe corrosion in the urea synthesis plant due to the presence of sulphur. The present invention enable the recycling of this off-spec material without having to separately remelt the product.

The ratio of urea: sulphur in the urea-sulphur fertiliser product is preferably from 1:1 to 100:1.

In one embodiment of the invention, one or more surfactants is added during step (a). The surfactants may help to further reduce the production of sulphur dust during fertiliser manufacture and may aid the formation of the fertiliser in step (b). The surfactants could include cationic surfactants such as the ethylene oxide or propylene oxide adduct of an aliphatic amine, or could include anionic surfactants such as a lignosulphonate.

In step (b) of the process of the invention, the dispersion of molten urea and molten sulphur is supplied to a forming unit to provide the urea-sulphur fertiliser. The forming unit can suitably be a granulator unit, a prilling unit, a compaction unit, a tablet forming unit, or a compressing unit. Preferably the forming unit is a granulator unit. The term "granulator unit" is used to describe a device for forming granules of fertiliser product. Commonly used granulators are described in Perry's Chemical Engineers' Handbook, chapter 20 (1997). Preferred granulators are drum granulators, paddle mixers (pug mills) or pan granulators. Preferably, the dispersion is pumped and distributed on a rolling bed of material in a drum granulator. Optionally, water and steam can be fed to the granulator to control the temperature of the granulation process as needed. Optionally, recycled fertiliser particles may be added to the granulator unit. Recycled fertiliser particles add granulation and nucleating agents.

Other ingredients may be added during the manufacturing process to tailor the fertiliser products to their intended end-use. Preferably such materials would be added during step (a). Examples include plant micro-nutrients such as boron, potassium, sodium, zinc, manganese, iron, copper, molybdenum, cobalt, calcium, magnesium and combinations thereof. These nutrients may be supplied in elemental form or in the form of salts, for examples as sulphates, nitrates or halides. The amount of plant micronutrients depends on the type of fertiliser needed and is typically in the range of between 0.1 to 5%, based on the total weight of the fertiliser.

In addition to the supply of plant micro-nutrients it is possible to incorporate other fertiliser products into the urea-sulphur fertiliser. For example, phosphate rock could be added to the dispersion of molten urea and molten sulphur before it is supplied to the forming unit, thereby providing a urea-sulphur-phosphate rock fertiliser. Alternatively, potassium chloride could be added to the dispersion of molten urea and molten sulphur before it is supplied to the forming unit, thereby providing a urea-sulphur-KCl fertiliser. In one embodiment, phosphoric acid could be could be added to the dispersion of molten urea and molten sulphur whilst it is hot and before it is supplied to the forming unit. The phosphoric acid would react with the urea, thereby providing a urea-phosphate-sulphur fertiliser. In another embodiment, the dispersion of molten urea and molten sulphur can be combined with NPK fertilisers.

Another material that could be incorporated into the urea-sulphur fertiliser is a clay such as bentonite. Suitably the clay could be added to the dispersion of molten urea and molten sulphur before it is supplied to the forming unit.

Preferably the urea-sulphur fertiliser is sorted by size in a sorting unit to achieve a more uniform size distribution. Typically, oversized fertiliser is crushed and returned to the sorting unit while undersized fertiliser is returned to the granulator or may be added as solid urea-sulphur in step (a). A preferred size range for the fertiliser is from 1.5 to 5.0 mm, more preferably from 2 to 4 mm, expressed as the average diameter of the fertiliser particles.

Experiments were conducted in order to demonstrate that processes wherein urea and sulphur are combined in a dispersion mill provide heat that could be used to melt solid sulphur or solid urea.

Heat Balance Calculation 1

An experiment was conducted to demonstrate that heat is generated in a dispersion mill when combining molten sulphur and molten urea. This heat could be advantageously used to melt solid sulphur or solid urea, so a proportion of the sulphur or urea feed could be added in the form of solid sulphur or solid urea. Molten sulphur and molten urea were fed to an open top steam jacketed L-2000 model dispersion mill from Kady International at rates of 243.2 kg/h for molten urea and 26.6 kg/h for molten elemental sulphur. The average temperatures (for four test runs) of the feeds and resulting emulsion are given in table 1 below:

TABLE 1

| Average Feed Temperatures (° C.) | | Average Emulsion Temperature (° C.) | |
|---|---|---|---|
| Urea | Sulphur | Minimum | Maximum |
| 137.6 | 135.8 | 138.6 | 142.2 |

The average of the four minimum measured emulsion temperatures and that of the four maximum emulsion temperatures are both higher than the individual average temperatures of the urea and sulphur feeds, showing that energy was generated inside the dispersion mill and transferred to the emulsion. The energy is expected to be mainly generated by friction between particles and mechanical forces within the mill. From the temperatures given in Table 1 we have calculated that 324 W/h are lost in the form of heat, of 2237 W/h available (applied from a 3 HP engine), yielding a 14% energy loss for the system.

Based on the above and the fact that elemental sulphur requires 63.1 W/kg to melt and urea 65.7 W/kg to melt, meaning that considering only milling losses, a supplemental 5.1 and 4.9 kg/h of elemental sulphur or urea respectively could be melted, representing an energy saving of approximately 2% on the basis of the total throughput to the system.

Heat Balance Calculation 2

A closed continuous dispersion unit (a OCCF model dispersion mill from Kady International) was used. Molten urea and molten sulphur were fed to the mill. Conditions of the feeds are given in table 2:

TABLE 2

| | Urea | | Elemental Sulphur | | | Dispersion Mill | | |
|---|---|---|---|---|---|---|---|---|
| | Flow Rate (kg/h) | Temp. (° C.) | Flow Rate (kg/h) | % | Temp. (° C.) | Freq. (Hz) | Current (Amp) | Outlet Temp. (° C.) |
| Run 1 | 471.1 | 131.3 | 35.5 | 7% | 134.9 | 15.0 | 6.2 | 140.6 |
| Run 2 | 558.6 | 130.5 | 43.2 | 7% | 137.1 | 15.0 | 6.1 | 143.4 |
| Run 3 | 565.2 | 125.9 | 85.1 | 13% | 135.5 | 15.0 | 6.3 | 137.3 |

Calculations were performed to determine the actual energy of the feeds and products in order to assess the amount of energy lost to heat by the system. The energy contained in the feeds to the mill was calculated to be the sum of the energies contained in each individual feed, such that Energy in=$\Sigma_{feeds} m \times cp \times T$ The energy contained in the product of the mill was calculated to be that of a homogeneous emulsion at the exit temperature of the mill, such that Energy out=$m \times cp \times T_{emulsion}$ The energy transmitted from the mill, and not used for the purpose of emulsifying sulphur in urea is energy lost to heat, according to the below equation $\Sigma_{feeds} m \times cp \times T = m \times cp \times T_{emulsion}$+milling losses Table 3 shows the outcome of the calculations:

TABLE 3

| | CALCULATED DATA | | | | | | |
|---|---|---|---|---|---|---|---|
| | Energy in kJ/h | Energy out kJ/h | Transferred Energy kJ/h | Potential to melt Elemental S | | Potential to melt Urea | |
| | | | | kg/h | % of feed | kg/h | % of feed |
| Run 1 | 86,398 | 92,411 | 6,013 | 26.5 | 75% | 25.4 | 5.4% |
| Run 2 | 102,033 | 111,901 | 9,868 | 43.4 | 101% | 41.7 | 7.5% |
| Run 3 | 103,995 | 112,718 | 8,722 | 38.4 | 45% | 36.9 | 6.5% |

From 45-100 wt % of the sulphur could have been supplied as solid sulphur and melted by the heat released in the mill; from 5.4-7.5 wt % of the urea could have been supplied as solid urea and melted by the heat released in the mill.

That which is claimed is:

1. A process for preparing a urea-sulphur fertilizer comprising steps of:
    (a) supplying urea and sulphur to a dispersion mill wherein a rotor turns within a slotted stator, thereby providing a homogenous dispersion of molten urea in molten sulphur, where the molten sulphur is the main constituent of the homogenous dispersion; and
    (b) supplying the dispersion of molten urea in molten sulphur to a forming unit to provide the urea-sulphur fertiliser;
    wherein the dispersion mill simultaneously melts and mixes the urea and sulphur to provide the homogenous dispersion of molten urea in molten sulphur; and
    wherein at least 5 wt % of the total urea supplied to the dispersion mill is solid urea prills.

2. A process according to claim 1, wherein solid sulphur is supplied to the dispersion mill.

3. A process according to claim 2, wherein all of the sulphur supplied to the dispersion mill is solid sulphur.

4. A process according to claim 1, wherein at least 10 wt % of the total urea supplied to the dispersion mill is solid urea.

5. A process according to claim 4, wherein all of the urea is supplied to the dispersion mill as solid urea, and all of the sulphur supplied to the dispersion mill is molten sulphur.

6. A process according to claim 1, wherein solid urea-sulphur is supplied to the dispersion mill.

7. A process according to claim 6, wherein molten urea and molten sulphur are supplied to the dispersion mill.

8. A process according to claim 1, wherein oversized granules and/or fines of urea, sulphur or urea-sulphur are supplied to the dispersion mill.

9. A process according to claim 1, wherein one or more surfactants is added during step (a).

10. A process according to claim 9, wherein a lignosulphonate is added during step (a).

\* \* \* \* \*